United States Patent [19]

Müller

[11] 3,993,188
[45] Nov. 23, 1976

[54] TRANSPORTING ARRANGEMENT
[75] Inventor: Hans Müller, Zofingen, Switzerland
[73] Assignee: Grapha-Holding AG, Hergiswil, Switzerland
[22] Filed: Feb. 2, 1976
[21] Appl. No.: 654,174

[30] Foreign Application Priority Data
Feb. 3, 1975  Switzerland.................... 1250/75

[52] U.S. Cl.............................. 198/461; 198/717
[51] Int. Cl.² ..................................... B65G 47/26
[58] Field of Search....................... 198/34, 76, 168; 271/202, 203, 233, 271

[56] References Cited
UNITED STATES PATENTS

| | | | |
|---|---|---|---|
| 3,190,434 | 6/1965 | Dardaine | 198/34 |
| 3,382,965 | 5/1968 | Pierce et al. | 198/34 |
| 3,589,497 | 6/1971 | Leach | 198/34 |
| 3,872,647 | 3/1975 | Langen et al. | 198/34 X |
| 3,901,375 | 8/1975 | Raque | 198/34 |

Primary Examiner—Evon C. Blunk
Assistant Examiner—Douglas D. Watts
Attorney, Agent, or Firm—Michael J. Striker

[57] ABSTRACT

A transporting arrangement for delivering products which are deposited at a first cycle at one end of an endless conveyor at a second higher cycle from the other end thereof. The arrangement includes an endless conveyor having an upper run moving at a first speed onto which the products to be transported are placed uniformly spaced from each other and a first chain having a run parallel to the upper run and movable in the same direction and at the same speed as the upper run. A second chain, driven at a higher speed than the first speed, carries on a run parallel to the upper run a plurality of entrainment members, each movable from a rest to an operating position, and moved to the latter position when the respective entrainment member overtakes one of a plurality of actuating means fixed equally spaced from each other to the first chain. The entrainment members in their operating position project upwardly beyond the upper run to thereby transport the products thereon at the higher speed to the other end of the upper run of the endless conveyor.

7 Claims, 4 Drawing Figures

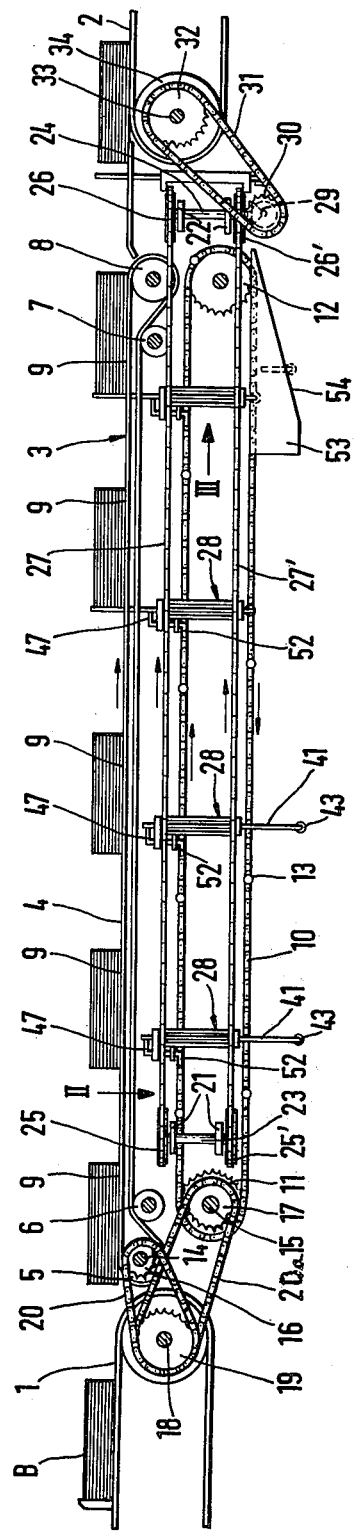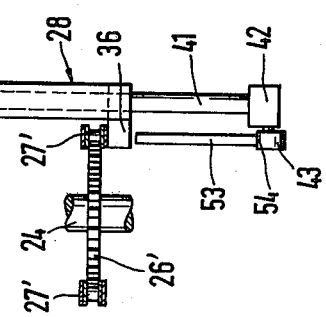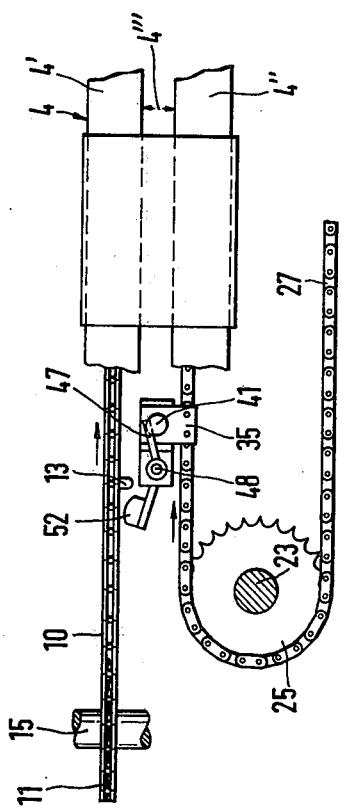

TRANSPORTING ARRANGEMENT

BACKGROUND OF THE INVENTION

The present invention relates to a transporting arrangement, and more specifically to a transporting arrangement for transporting loose book- or leaflet-blocks from a printing machine to a bookbinding machine.

Printing machines are known in the art in which the printed product is prepared in form of a loose book- or leaflet-block which is subsequently delivered in a predetermined cycle from this machine. Depending on the size of the book block, the output of the machine increases or decreases, that is, the number of book blocks per time unit, respectively the cycles at which the machine operates, varies in dependence on the size of the book block. Such sometimes great fluctuations of the operating cycle of the printing machine have prevented up to the present time a synchronous transmitting of the book blocks to a bookbinding machine, which usually operates at a faster cycle than the printing machine. The cycle at which the bookbinding machine operates is likewise subjected to considerable variations depending on the glue to be used and on other factors.

SUMMARY OF THE INVENTION

It is an object of the present invention to provide a transporting arrangement in which products placed at one end of transporting means at a predetermined cycle or timed sequence are delivered from the other end of the transporting means at a cycle or timed sequence different from said predetermined cycle or timed sequence which is preferably greater than said predetermined cycle or timed sequence.

It is more specifically an object of the present invention to provide for transporting means in which book blocks delivered in a predetermined cycle from a printing machine onto one end of the transporting means are transferred from the other end thereof to a bookbinding machine at a timed sequence at which the bookbinding machine operates.

With these and other objects in view, which will become apparent as the description proceeds, the transporting arrangement according to the present invention mainly comprises endless transporting means having an upper run adapted to receive products to be transported thereon, first drive means for driving the endless transporting means at a predetermined speed, placement means upstream of the endless transporting means for placing products in timed sequence on one end of said upper run so that such products are transported spaced from each other by the upper run, a first endless chain having a run parallel to the upper run of the endless transporting means and being connected to the first drive means to be driven thereby at a speed equal to the predetermined speed, a plurality of actuating means fixed equally spaced from each other to the first endless chain and arranged in such a manner that the actuating means on the run of the first chain are respectively located intermediate successive products on the upper run, at least one second endless chain having a run parallel to the upper run and a return run, a plurality of entrainment means connected to the second chain equally spaced from each other and each movable between a rest and a working position in which the entrainment means respectively project into the path at which the products are transported by the endless transporting means, second drive means for driving the second chain at a speed greater than the predetermined speed so that the entrainment means on the second chain will overtake the actuating means on the first chain, means on each of the entrainment means for moving the latter from the rest to the working position when an entrainment means overtakes an actuating means on the run of the first chain, and means cooperating with the entrainment means for moving the latter from the working to the rest position in the region of the return run of the second chain.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic side view of the transporting arrangement according to the present invention;

FIG. 2 is a partial top view of the arrangement shown in FIG. 1 as viewed in the direction of the arrow II;

FIG. 3 is a partial end view of the arrangement shown in FIG. 1 as viewed in the direction of the arrow III.

DESCRIPTION OF THE PREFERRED EMBODIMENT

Figure 4:
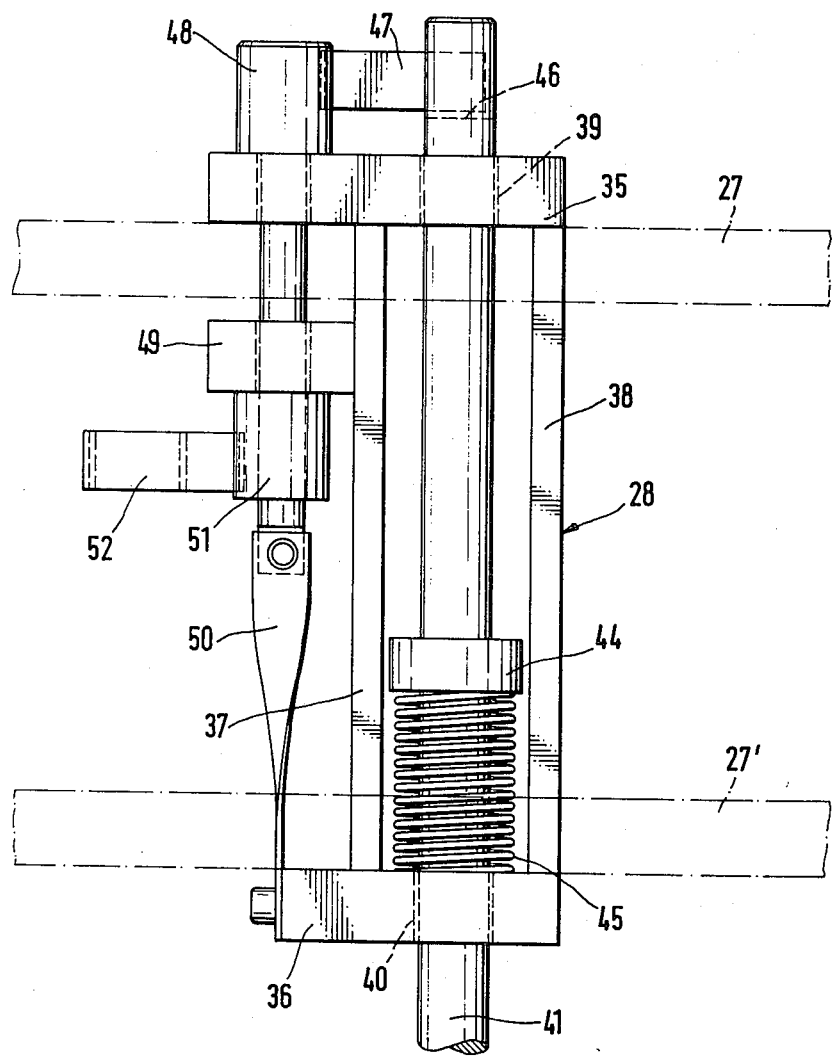
FIG. 4 is a front view of one of the entrainment means shown in FIG. 1 and drawn to an enlarged scale.

The transporting arrangement 3 schematically illustrated in FIG. 1 serves especially to transport loose leaflet or book blocks B from a non-illustrated printing machine to a likewise non-illustrated bookbinding machine. Such bookbinding machines are for instance described and illustrated in the U.S. Pat. No. 3,283,351. The bookbinding machine comprises a transporting band 2 which receives the blocks B from the printing machine and which transfers the blocks one after the other between the clamping jaws of the bookbinding machine. The transporting arrangement 3 is designed in order to transmit the blocks B which are delivered by the band 1 of the printing machine at a predetermined timed sequence to the band 2 of the bookbinding machine at a timed sequence at which the bookbinding machine operates and which is greater than the timed sequence or cycle at which the printing machine operates. The transporting arrangement 3 comprises an endless transporting means 4 which is guided over rollers 5–8 and on the upper run of which book blocks B are placed on spaced portions 9 of the upper run, which book blocks are placed onto one end, shown in FIG. 1 as the left end, of the upper run of the endless transporting means 4 by means of placement means or an endless band 1 from the non-illustrated printing machine. The endless transporting means 4 is constituted by two parallel endless bands 4' and 4" which define between the inner edges thereof a slot 4''' (FIG. 2). The transporting arrangement comprises further a first endless chain 10 which is guided over chain gears 11 and 12. The first chain 10 has an upper run which extends parallel and is moved in the same direction as the upper run of the endless transporting means 4. A plurality of dogs or actuating means 13 are fixed equally spaced from each other to the first endless chain 10 and arranged in such a manner that the actuating means 13 on the run of the first chain 10 are respectively located, as viewed from above, intermediate the surface portions 9 on which successive products on the upper run of the endless transporting means 4 are located. The reversal roller 5, respectively 11, is mounted on a shaft 14, respectively 15, to each of which a chain gear 16, respectively 17, is connected for rotation therewith. On the drive shaft 18 of the discharge band 1 are two chain gears 19 mounted for rotation therewith, in which in FIG. 1 only one of the two chain gears is visible. One of the chain gears 19 is connected by a chain 20 with the chain gear 16 and the other of the chain gears 19 is connected by a chain 20a with the chain gear 17 so that the endless transporting means 4 and the first chain are driven with the same speed as the discharge band 1. Two stationary bearings 21 and 22 are arranged laterally of the first endless chain 10 in which the shafts 23 and 24 are respectively turnably mounted. On each of the two shafts 23, respectively 24, is mounted an upper chain gear 25, respectively 26, and a lower chain gear 25', respectively 26'. An endless chain 27 is guided over the upper chain gears 25 and 26 and an endless chain 27' is guided over the lower chain gears 25' and 26'. The two chains 27 and 27' form together second endless chain means on which a plurality of entrainment means 28 are arranged equally spaced from each other.

For simplification reasons the entrainment means 28 which are mounted on the runner of the chains 27 and 27' facing the viewer are omitted in FIG. 1.

The shaft 24 is connected by an angle drive 29 with a chain gear 30 which in turn is driven by a chain 31 from a chain gear 32. The drive connection between the band 2 which delivers the blocks B to the bookbinding machine and the chains 27 and 27' is made in such a manner that the chain 27, 27' moves at the same speed as the band 2. The number and distance between successive entrainment means 28 is chosen in such a manner that for each cycle at which the blocks B are transported by the band 2 one entrainment means 28 will arrive at the right end of the endless transporting means 4.

The construction of each entrainment means 28 and the cooperation of the entrainment means with the first chain 10 will not be described in connection with FIGS. 2-4.

Each of the entrainment means 28 comprises a frame composed of an upper plate 35, a lower plate 36 and two connecting members 37 and 38 connecting the upper and the lower plate spaced from each other. The plates 35 and 36 and the connecting members 37 and 38 are fixedly connected to each other to form a rigid unit. The upper plate 35 is connected to the upper chain 27 and the lower plate 36 to the lower chain 27'. The plates 35 and 36 are respectively provided with coaxially bores 39 and 40 in which an entrainment rod 41 is arranged movable in axial direction. The entrainment rod 41 is provided at its lower end with a bearing body 42 in which a roller 43 is freely turnably mounted. An annular collar 44 is fixedly connected to the entrainment rod 41 between the plates 35 and 36 and a pretensioned coil compression spring 45 is arranged about the rod 41 abutting with opposite ends onto the collar 44 and the lower plate 36, respectively. The coil compression spring 45 constitutes therefore biasing means tending to move the entrainment rod 41 in axial direction upwardly until the bearing body 42 abuts against the lower plate 36. The entrainment rod 41 is provided at its upper end with a cutout 46 in which a pawl 47 is engaged in the rest position of the rod as shown in FIG. 4. The pawl 47 constitutes, therefore, holding means for holding the rod 41 in the rest position against the force of the coil compression spring 45. One end of the pawl 47 is fixed to a pin 48, which is turnably mounted in a corresponding bore of the upper plate 35 as well as in a bearing body 49 fixed to the connecting member 37 and laterally projecting therefrom. The lower end of the turnable pin 48 is connected by a torsion spring 50 with the lower plate 36. The torsion spring 50 is pretensioned in such a manner so as to tend to turn the pin 48 in clockwise direction to thereby move the pawl 47 into the cutout 46 at the upper end of the entrainment rod 41. An annular member 51 is fixed to the pin 48 between the torsion spring 50 and the bearing member 49. A lug or abutment means 52 projects laterally outwardly from the annular member 51. The lug 52 is arranged in such a manner that in the position thereof as shown in FIGS. 2 and 4 it will project into the path of the dogs or actuating means 13 (see FIG. 2), when the entrainment means 28 is moved in the same direction and parallel with the upper run of the transporting means 4. If a pressure is exerted on the lug 52 so that the turnable pin 48 will turn the pawl 47 out of the cutout 46, the coil compression spring 45 will expand and move the entrainment rod 41 from its rest position in axial direction upwardly to its working position.

The above-described transporting arrangement will operate as follows. If the printing machine as well as the bookbinding machine are in operation, then the discharge band 1, the endless transporting means 4 and the first chain 10 are operated at the same speed corresponding to the operating cycle of the printing machine. The discharge band 1 places in accordance with the operating cycle of the printing machine book blocks B successively onto the upper run of the transporting means 4. The delivery band 2 of the bookbinding machine and the entrainment chains 27, 27' will operate at a greater speed than the aforementioned speed and corresponding to the higher operating cycle of the bookbinding machine whereby the delivery band 2 and the chains 27 and 27' are operated at the same speed. The blocks B will thus be placed onto spaced surface portions 9 of the upper run of the endless transporting means 4 while the dogs or actuating means 13 on the first chain 10 will be respectively located, as viewed from above between successive blocks B. Since the chains 27, 27', carrying the entrainment chambers 28, are operated at a higher speed than the first chain 10, the entrainment means 28 will overtake, in the region of the upper run of the endless transporting means 4, the dogs or actuating means 13 mounted spaced from each other on the first chain 10. At the left end of the upper run of the endless transporting means 4, as viewed in FIG. 1, all entrainment rods 41 of the entrainment means 28 are in their lower rest position, as shown in FIG. 4. As soon as the entrainment means 28 overtake a respective one of the actuating means 13, the lug 52 and the turnable pin 48 are turned so that the pawl 47 of the respective entrainment means 28 will release the entrainment rod 41 and the latter will suddenly move in upward direction under the action of the coil compression spring 45 between the two bands 4' and 4''. The entrainment rod 41 will thereby extend with its upper portion between two successive book blocks B on the upper run of the endless transporting means 4. The entrainment rod 41 moved at the higher speed will gradually approach the block B ahead of it and after having caught up therewith will move the block on the upper run of the endless transporting means 4 relative to the latter. At the right end of the upper run of the endless transporting means 4, the entrainment rod 41 will move the book block B onto the delivery band 2 of the bookbinding machine the upper run of which moves with the same speed as the entrainment means 28. Since at each operating cycle of the bookbinding machine an entrainment means 28 will arrive at the right end of the upper run of the endless transporting means 4, a book block B will be placed on the delivery band 2 at each cycle of the bookbinding machine insofar as no gap is formed on the upper run of the endless transporting means due to the higher speed of the chains 27 and 27'.

It is to be understood that separate rollers 7 and 8 are provided for each of the endless bands 4' and 4" and that these rollers are mounted on stub shafts, the inner ends of which form a gap similar to the gap ''', so that the entrainment rod 41 may pass in its upwardly projecting working position between the rollers 7 and 8 and the shafts turnably mounting the rollers.

At the start of the return movement of the entrainment members 28, the latter are passed by a stationary cam 53 with a cam face 54. The cam face 54 is downwardly inclined in the direction of the return runs of the chains 27, 27' and is engaged by the roller 43 on the lower end of each entrainment rod 41 so that the latter will be moved in downward direction against the force of the coil compression spring 45 until the pawl 47 will again move under the action of the torsion spring 50 into the cutout 46 to thereby hold the entrainment rod 41 in its rest position as shown in FIG. 4.

It will be understood that each of the elements described above, or two or more together, may also find a useful application in other types of transporting arrangements differing from the types described above.

While the invention has been illustrated and described as embodied in a transporting arrangement for delivering products from one end of an endless transporting means at a higher speed than such products are placed on the opposite end thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transporting arrangement comprising endless transporting means having an upper run adapted to receive products to be transported thereon; first drive means for driving said endless transporting means at a predetermined speed; placement means upstream of said endless transporting means for placing products in timed sequence on one end of said upper run so that such products are transported spaced from each other by said upper run; a first endless chain having a run parallel to said upper run of said endless transporting means and being connected to said first drive means to be driven thereby at a speed equal to said predetermined speed; a plurality of actuating means fixed equally spaced from each other to said first endless chain and arranged in such a manner that the actuating means on said one of said first chain are respectively located intermediate successive products on said upper run; at least one second endless chain having a run parallel to said upper run and a return run; a plurality of entrainment means connected to said second chain equally spaced from each other and each movable between a rest and a working position in which said entrainment means respectively project into the path at which said products are transported by said endless transporting means; second drive means for driving said second chain at a speed greater than said predetermined speed so that said entrainment means on said second chain overtakes said actuating means on said first chain; means on each of said entrainment means for moving the latter from said rest to said working position when an entrainment means overtakes an actuating means on said run of said first chain; and means cooperating with said entrainment means for moving the latter from said working to said rest position in the region of said return run of said second chain.

2. A transporting arrangement as defined in claim 1, wherein said endless transporting means comprises two endless bands having parallel upper runs spaced transversely from each other, said entrainment means projecting, in said working position thereof, between and upwardly beyond said upper runs of said endless bands.

3. A transporting arrangement as defined in claim 2, wherein each of said entrainment means comprises an entrainment rod axially movable between said rest position and said working position projecting between and upwardly beyond said upper runs of said endless bands, and wherein said means for moving said entrainment means to said working position comprises biasing means for permanently biasing said entrainment rod to said working position, and including holding means engaging said entrainment rod for holding said entrainment rod against the force of said biasing means in said rest position, and releasing means connected to said holding means for rendering the latter inactive when the respective entrainment means overtakes an actuating means on said run of said first chain so that the entrainment rod is moved under the force of said biasing means to said working position.

4. A transporting arrangement as defined in claim 3, wherein said means for moving said entrainment means from said working to said rest position comprises a stationary cam face and roller follower means connected to said entrainment rod and cooperating with said cam face.

5. A transporting arrangement as defined in claim 3, wherein said holding means comprises a pawl movable between a holding position engaging said entrainment rod in said rest position and an inactive position, spring means permanently biasing said pawl to said holding position, each of said releasing means comprises an abutment means located in the path of said actuating means to move said pawl against the force of said spring means to said inactive position when the respective entrainment means overtakes a respective actuating means.

6. A transporting arrangement as defined in claim 1, wherein said placement means comprise an endless discharge band which is moved at said predetermined speed by said first drive means and on which the products are placed at a predetermined first cycle so that the products are placed spaced from each other onto one end of the upper run of the endless transporting means; and including an endless delivery band having one end adjacent to the other end of said upper run of said endless transporting means, and wherein said second drive means drive said delivery band at said greater speed so that the products are transported thereon at an operating cycle which is higher than said predetermined first cycle.

7. A transporting arrangment as defined in claim 6, wherein the number of entrainment means is chosen in such a manner that during operation of the transporting arrangement one entrainment means will be located at the other end of said upper run for each operating cycle at which the products are transported by said delivery band.

* * * * *